United States Patent
Lindvall et al.

(10) Patent No.: US 8,160,084 B2
(45) Date of Patent: Apr. 17, 2012

(54) METHOD FOR TIME-STAMPING MESSAGES

(75) Inventors: Ossi Lindvall, Oulu (FI); Tomi Junnila, Piikkiö (FI)

(73) Assignee: Nokia Corporation (FI)

( * ) Notice: Subject to any disclaimer, the term of this patent is extended or adjusted under 35 U.S.C. 154(b) by 1456 days.

(21) Appl. No.: 11/525,125

(22) Filed: Sep. 22, 2006

(65) Prior Publication Data

US 2008/0075015 A1   Mar. 27, 2008

(51) Int. Cl.
*H04L 12/28* (2006.01)

(52) U.S. Cl. ........ 370/412; 370/389; 370/465; 370/429; 370/503; 370/428

(58) Field of Classification Search .................. 370/252, 370/389, 412, 465, 503, 413, 428, 429
See application file for complete search history.

(56) References Cited

U.S. PATENT DOCUMENTS

| | | | |
|---|---|---|---|
| 5,859,980 A * | 1/1999 | Kalkunte | 709/232 |
| 6,314,530 B1 | 11/2001 | Mann | |
| 6,397,352 B1 * | 5/2002 | Chandrasekaran et al. | 714/16 |
| 6,567,932 B2 * | 5/2003 | Edwards et al. | 714/30 |
| 6,615,371 B2 * | 9/2003 | McCullough et al. | 714/45 |
| 6,658,519 B1 * | 12/2003 | Broberg et al. | 710/311 |
| 7,069,176 B2 * | 6/2006 | Swaine et al. | 714/45 |
| 7,287,194 B2 | 10/2007 | Moyer | |
| 7,463,653 B2 * | 12/2008 | Swoboda et al. | 370/503 |
| 7,957,275 B2 * | 6/2011 | Meier | 370/230 |
| 7,961,730 B2 * | 6/2011 | Park | 370/392 |
| 2002/0178405 A1 | 11/2002 | McCullough et al. | |
| 2006/0039287 A1 | 2/2006 | Hasegawa et al. | |
| 2006/0039393 A1 * | 2/2006 | Firoiu et al. | 370/412 |
| 2006/0259831 A1 * | 11/2006 | Sohm et al. | 714/45 |
| 2007/0061646 A1 * | 3/2007 | Whetsel | 714/726 |
| 2007/0226544 A1 * | 9/2007 | Woodhouse | 714/45 |
| 2009/0125756 A1 * | 5/2009 | Swaine et al. | 714/45 |
| 2009/0204951 A1 * | 8/2009 | Laurenti et al. | 717/128 |

FOREIGN PATENT DOCUMENTS

| | | |
|---|---|---|
| JP | 05227153 | 9/1993 |
| JP | 2006-245992 | 9/2006 |
| KR | 2004/0026507 | 3/2004 |
| WO | 2004/086636 A2 | 10/2004 |
| WO | 2006/007292 A2 | 1/2006 |
| WO | 2006/022876 A1 | 3/2006 |

OTHER PUBLICATIONS

International Search Report, PCT/IB2007/002693 filed Jun. 2, 2008.
Chinese Office Action, Chinese Patent Application No. 200780039255.7, Date: Jun. 9, 2011, pp. 1-3, English Translation: pp. 1-2.

(Continued)

*Primary Examiner* — Ricky Ngo
*Assistant Examiner* — Dewanda Samuel
(74) *Attorney, Agent, or Firm* — Squire Sanders (US) LLP

(57) ABSTRACT

A method for calculating message queue times. The method includes queuing a message into a buffer at a first time, generating a time stamp message representative of a number of messages in the buffer at the first time, transmitting the message to another device, transmitting the time stamp message to a trace device, and calculating the message queue time based upon the time stamp message, the first time, and an amount of data in the buffer.

20 Claims, 4 Drawing Sheets

OTHER PUBLICATIONS

European Search Opinion corresponding to European patent application No. 07848794.9 dated Sep. 22, 2011.
Supplementary European Search Report issued in corresponding European patent application No. 07848794.9 dated Sep. 7, 2011.
Canadian Office Action corresponding to Canadian Patent Application No. 2,609,958 dated Aug. 30, 2011, 2 pages.
Chinese Office Action corresponding to Chinese Patent Application No. 2007800392557 dated Sep. 28, 2011, pp. 1-6, English Translation: pp. 1-7.
Japanese Office Action corresponding to Japanese Patent Application No. 2009-544398 dated Oct. 4, 2011, pp. 1-3. English Translation: pp. 1-4.
Rosenberg et al, "SIP: Session Initiation Protocol," RFC 3261, Network Working Group, Jun. 2002, pp. 1-252.
Jim Tomcik, "QFDD Technology Overview," IEEE 802.20-05-59, Working Group on Mobile Broadband Wireless Access, Oct. 28, 2005, pp. 1-70, URL, http://grouper.ieee.org/groups/802/20/Contribs/C802.02-05-59.pdf.
Korean Office Action, Korean Patent Application No. 2009-7008178, Date: Sep. 24, 2010, pp. 1-4, English Translation: pp. 1-2.
Chinese Office Action, Chinese Patent Application No. 2007-800392557. Date of Issuance: Jun. 6, 2010, pp. 1-4, English Translation: pp. 1-3.

* cited by examiner

METHOD FOR TIME-STAMPING MESSAGES

BACKGROUND OF THE INVENTION

1. Field of the Invention

Embodiments of the invention generally relate to time stamping processes for data queues.

2. Description of the Related Art

Accurately measuring relative through times of messages from multiple trace sources inside one application specific integrated circuit (ASIC), when there is a first in first out-type (FIFO) buffer between a source or device being traced, and the target or device being used to interpret the trace data, is difficult using typical methods.

Current methods employ the use of a time stamp counter to measure the time within an ASIC; however, this process requires a fairly large counter to be implemented inside the ASIC for accurate timing measurements to be made. Further complicating the problem of accurately measuring the through times for a message, typical methodologies require the accuracy, which is directly proportional to the size, of the time stamps to be scaled down to reduce the bandwidth consumed by counter based time stamps. Further still, in order to reduce power consumption, an additional sleep clock counter is typically used to keep track of time during ASIC deep sleep, which requires the additional counter as well as the process of adjusting the time stamp counter by software after coming out of deep sleep. This further complicates the time stamping process with an additional timer to control and software integration.

Therefore, there is a need for an apparatus and method configured to accurately measure message queue times, while consuming minimal physical hardware overhead and minimal bandwidth.

SUMMARY OF THE INVENTION

Embodiments of the invention generally provide an apparatus and method configured to accurately measure message queue times, while consuming minimal physical hardware overhead and minimal bandwidth. In order to measure the message queue times, the reception time, the FIFO buffer status at the time of the queuing of the message, and the lengths of the previous messages are used to calculate a time stamp on the receiver side of the message transmission.

Embodiments of the invention may further provide a method for calculating message queue time. The method includes queuing a message into a buffer at a first time, generating a time stamp message representative of a number of messages in the buffer at the first time, transmitting the message to another device, transmitting the time stamp message to a trace device, and calculating the message queue time based upon the time stamp message, the first time, and an amount of data in the buffer.

Embodiments of the invention may further provide a system for determining message queue time. The system includes a trace interface device positioned on an integrated circuit and configured to queue a message into a buffer at a first time and to generate a time stamp message representative of a number of messages in the buffer at the first time, and an output connecting the trace interface device with and external trace device, wherein the external trace device is configured to calculate the message queue time based upon the time stamp message, the first time, and an amount of data in the buffer.

Embodiments of the invention may further provide a circuit for calculating message queue times. The circuit includes a queuing module configured to queue a message into a buffer at a first time, a time stamp generating module configured to generate a time stamp message representative of a number of messages in the buffer at the first time, a communication link configured to allow transmission of the message to another device, and a trace module configured to calculate the message queue time based upon the time stamp message, the first time, and an amount of data in the buffer.

Embodiments of the invention may further provide a system for calculating message queue times. The system includes queuing means for queuing a message into a buffer at a first time, time stamp generating means for generating a time stamp message representative of a number of messages in the buffer at the first time, a communication means configured to allow transmission of the message to another device, and calculating means for calculating the message queue time based upon the time stamp message, the first time, and an amount of data in the buffer.

Embodiments of the invention may further provide a computer program embodied on a computer readable medium, the computer program being configured to control, through a processor executing the computer program, a method for calculating message queue time. The method includes queuing a message into a buffer at a first time, generating a time stamp message representative of a number of messages in the buffer at the first time, transmitting the message to another device, transmitting the time stamp message to a trace device, and calculating the message queue time based upon the time stamp message, the first time, and an amount of data in the buffer.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
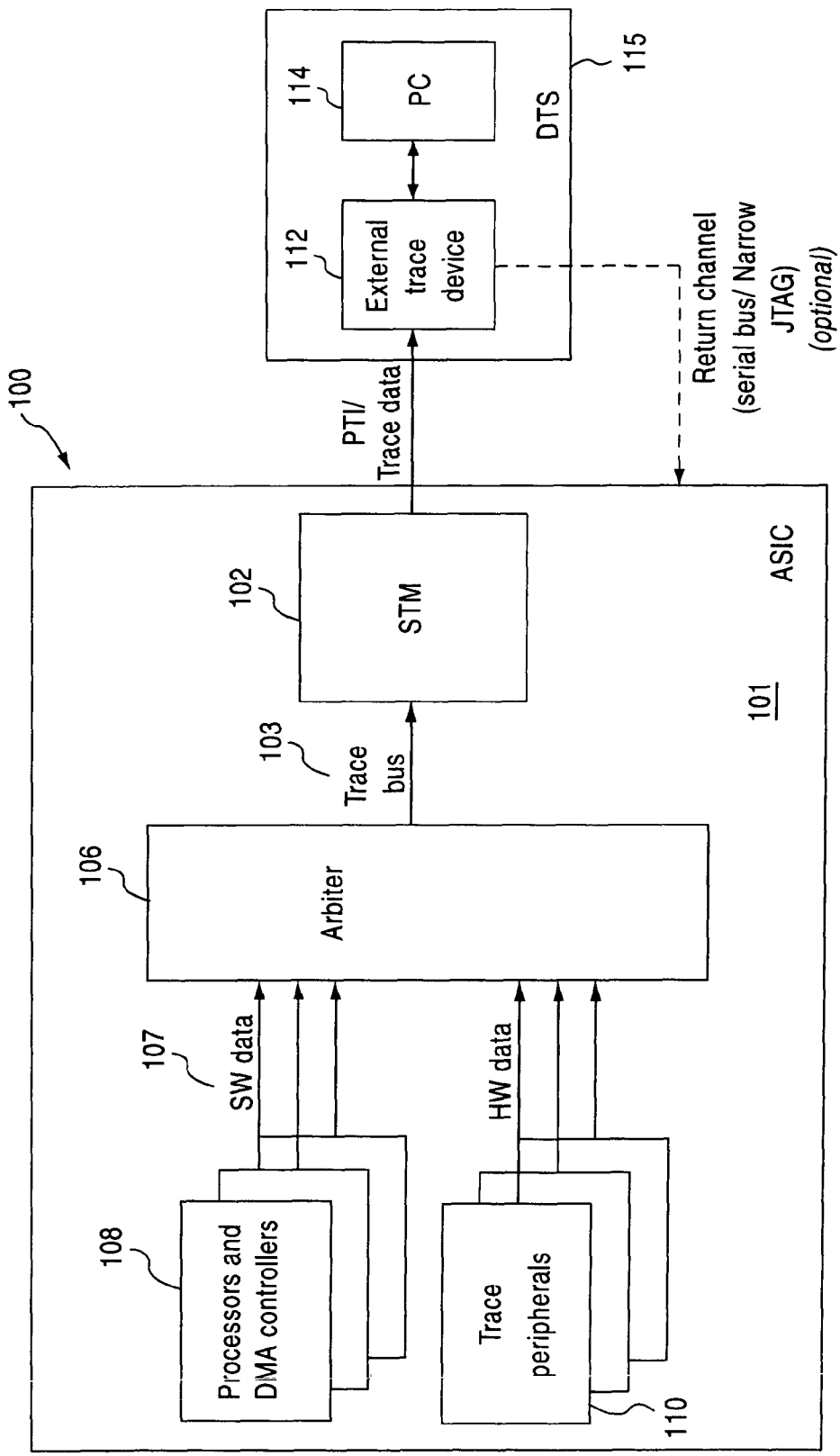
FIG. 1 illustrates a high level block diagram of an exemplary external trace interface (XTI) system of the invention.

FIG. 1 illustrates a high level block diagram of an exemplary external trace interface (XTI) system 100 of the invention positioned on an ASIC 101. Although the system 100 is positioned on an ASIC 101 in this embodiment, the system 100 may alternatively be positioned on any discrete circuit and the invention is not limited to use with an ASIC. The XTI system 100 generally includes a system trace module (STM) 102 in communication with an arbiter 106. The arbiter 106 is also generally in communication with a plurality of processors and DMA controllers 108 via software data connections 107 (SW data). The system 100 further includes memory and peripherals 110 in communication with the arbiter 106, an external trace device 112 in communication with the STM 102, and a PC 114 in communication with the external trace device 112. The external trace device 112 and PC 114 are included as part of a debut and test system (DTS) 115.

Figure 2:
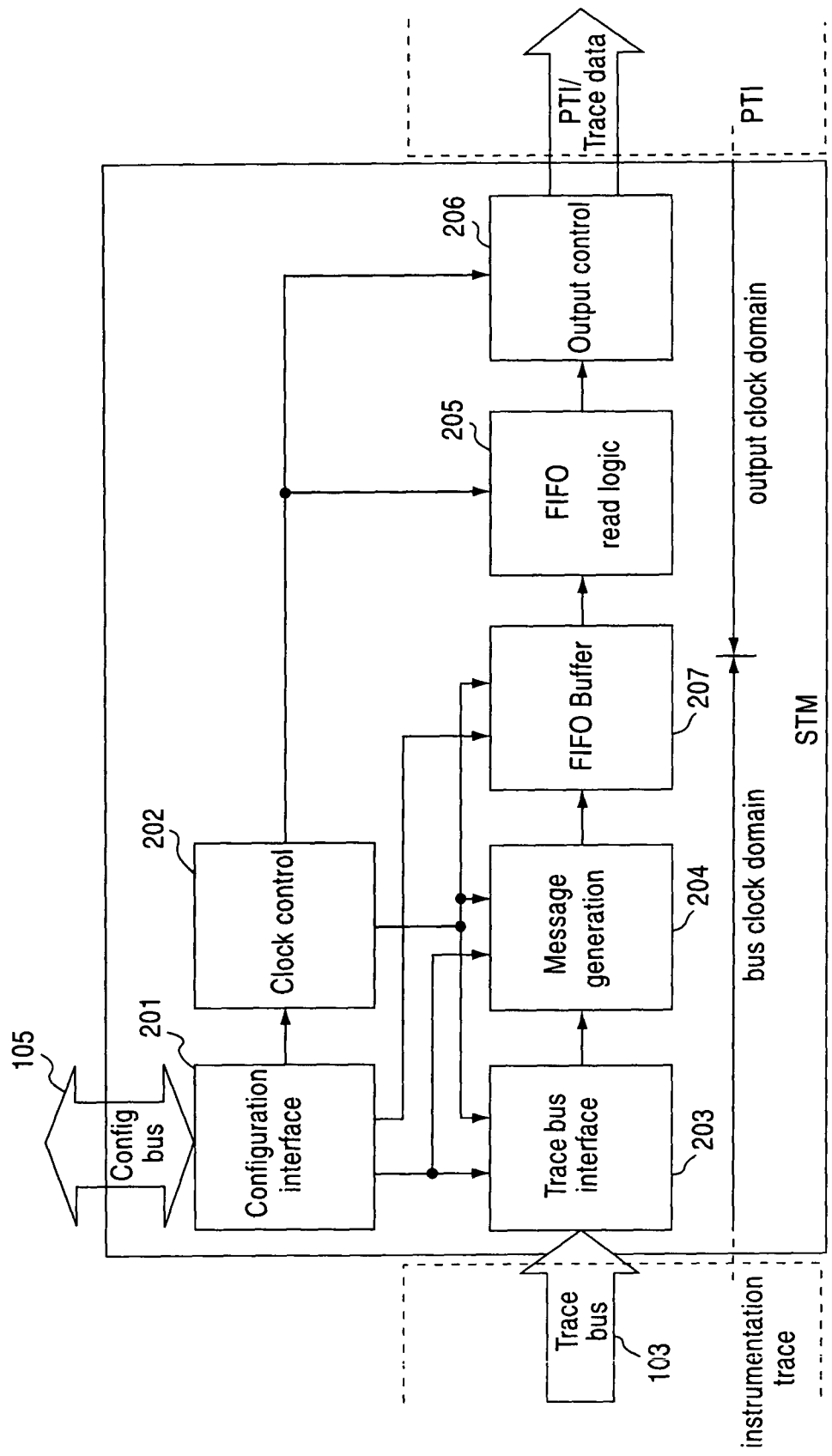
FIG. 2 illustrates a high level block diagram of an exemplary XTI system of the invention showing the driving clocks for the elements.

FIG. 2 illustrates a high level block diagram of an exemplary XTI system 100 sub-blocks showing the driving clocks for the elements. More particularly, in the exemplary XTI system 100, the components on the left side of the diagram (the configuration interface device 201, clock control device 202, trace bus interface device 203, and the message generation device 204) are all clocked with a bus clock. Conversely, the components illustrated on the right side of the diagram (FIFO Read Logic 205 and Output Control 206) are clocked in the XTI output clock domain. The FIFO buffer 207, however, bridges between the two clock domains. The main inputs to XTI sub-blocks are two buses connected thereto. A first bus, generally referred to as the configuration bus 105, is generally used to set the run-time configuration (enabling and disabling different masters, set internal clock settings, etc), while the second bus, generally referred to as the trace bus 103, is used to capture trace data and is positioned between the STM 102 and the arbiter 106.

Returning to the discussion of the system 100 illustrated in FIG. 1, the STM 102 is connected to the bus masters through an operational core protocol (OCP) crossbar-type architecture, which makes it possible for several masters to utilize the STM 102 for tracing. The STM 102 is generally an OCP bus-type slave module, which accepts write transfers on the trace bus 103 positioned between the STM 102 and the arbiter 106. The STM 102 may further be configured to encapsulate the data and forward the encapsulated data to the external trace device 112 for further processing without using the overhead of the ASIC 101.

The configuration bus 105, illustrated in FIG. 2, is generally standard OCP interface with the simple MByteEn OCP extension. The configuration registers themselves can be implementation-specific, but should include at least settings that enable bits for each master connected to STM 102, and if a master is disabled, the STM 102 will generally discard the trace data received from the disabled master. Additionally, the configuration registers generally include clock adjustment registers that can be used to adjust the clock rate of the interface between STM 102 and the external trace device 112.

The trace bus 103 is generally a write-only-type OCP interface that is positioned between the STM 102 and the arbiter 106. The trace bus 103 generally uses the MReqInfo extension in addition to the MByteEn extension to write trace data to the STM 102. Generally, a TraceMReqInfo signal is used to distinguish the different OCP bus masters from one another. The trace bus 103 will generally be either 32 or 64 bits wide, depending on the ASIC architecture, and the trace bus 103 will generally support 8-, 16-, 32-, and 64-bit accesses. The trace bus 103 address is generally 12 bits wide for 64-bit systems, or 11 bits for 32-bit systems. The STM 102 will generally discard sub-word addressing, i.e., the 3 least significant bits in the address for 64-bit systems, or the 2 least significant bits for 32-bit systems, and will only use TraceMByteEn for partial word accesses. When a 64-bit STM 102 is used, 16 and 32-bit accesses will generally be aligned to the proper word boundaries. Similarly, when a 32-bit STM 102 is used, a 16-bit access will generally be aligned to 16-bit word boundaries.

To protect against trace data loss, the STM 102 is generally configured and controlled to halt the trace bus 103, i.e., it will not accept further transfers on the trace bus 103, if the FIFO buffer 207 is full. Additional wait states may also be generated when STM 102 is queuing MASTER, OVRF, or A8 messages. The STM 102 will only store one message in the FIFO in one clock cycle, and therefore, the masters to which STM 102 is connected will generally either be able to handle relatively long waits while STM 102 is freeing up space in the FIFO, or be able to drop unnecessary data before writing it to the STM 102. Outside of these special circumstances, the STM 102 is generally configured to accept one access per clock cycle and not cause extra wait states to the masters.

The accesses captured by the trace bus interface are encapsulated in a message generation sub-block to create data messages to the trace device. The XTI system recognizes two distinct modes of tracing. Each master can be configured for either SW or HW mode, which use slightly different message combinations to output different types of data. Both SW and HW messages use the same basic low-level message types, although not all message types are used by both modes. Message generation is performed by a finite state machine (FSM) (not shown). The FSM generally starts the STM 102 in an IDLE state, and will return to the state when the FIFO buffer is empty and there are no messages to process. During IDLE state, STM 102 may transmit IDLE messages, and the STM 102 can also stop the clock output when it is idle.

The STM 102 will generally transition to an SW state if it receives an access from an SW master, and it isn't already in the SW data state for the same master. In the SW state, the STM 102 will queue a MASTER message to inform the trace device which master the next messages will come from. The STM 102 will also automatically transition to a SW address state from the SW state. In the SW address state, STM 102 will queue an A8 message to signal the channel number for the subsequent data message(s). The STM 102 will automatically transition to the SW data state from the SW address state.

The STM 102 will stay in the state until an access is received from another master, from another channel on the same master, or if no new messages are received before the FIFO buffer is emptied. In the SW data state, the STM 102 will queue data messages for the received write accesses. The size of the data message is determined by the byte enables, and it will generally be as small as possible but still contain all active bytes in the access. The STM 102 will transition to the HW state if it receives an access from a HW master, and it isn't already in the HW data state for the same master. In the HW state, STM will queue a MASTER message to inform the trace device which master the next messages come from. The STM 102 will transition to an OVRF state from the HW or HW data states if the Overflow bit in the address is high. In the OVRF state, STM will queue an OVRF message to inform the trace device that an overflow has occurred on the master. The STM will then transition to the HW data state from the HW state if the Overflow bit in the address is low, and automatically from the OVRF state. In the HW data state, STM will queue data messages for the received write accesses.

Generally, the reference XTI design spends at least one clock cycle in each of the above noted states, normally only one clock cycle, but if the FIFO buffer is full, the delay might be longer. Therefore, queuing a SW message from the IDLE (or HW data) state will generally consume three clock cycles, during which the STM 102 will generally not accept any additional bus access requests. As long as the STM 102 stays in the HW data or SW data states noted above, it can queue further messages from the same master in one clock cycle.

Time stamps in the messages are configured to generally indicate to the trace device 112 how many messages there were in the FIFO buffer 207 at the time a message was queued. The time stamp indicating the number of messages makes it possible for the trace device 112 to calculate the time when the message was queued based on the time the message arrived at the trace device 112, and the amount of data in the FIFO before the message is transmitted. The STM 102 will generally handle the message encapsulation process, except for signaling the end of a message, which is typically signaled using a time-stamped message. This end-of-message marker is not required by the XTI hardware of the invention, but the markers from the end of the message may nevertheless be used by the trace device and the software protocol, which can also use the time-stamped messages to separate consecutive messages in case of data loss from overflows or other disturbances.

The SW mode provides an efficient method to transmit software debug information through the XTI interface. The SW mode generally defines about 256 different channels, which can be separately handled in the trace device 112. An exemplary use for the channels would be to allocate a different channel for each software process or task, so debug information for the task being debugged can easily be extracted. Furthermore, interrupts do not need to be disabled in the software while sending SW messages, because channels create a natural threading system for the messages, thus preserving the message content even if other tasks interrupt the send process. SW mode generally does not support data loss, so it is generally not possible to generate OVRF messages. The STM 102 will halt the trace bus (and therefore the master connected to it) when the FIFO buffer 207 is full.

The HW mode provides a flexible method to transmit different types of data through the XTI interface, without STM 102 necessarily understanding the significance or content of the data. HW messages are generally generated using special auxiliary modules, which can provide the system with I/O tracing and program counter tracking functionality, for example. In the HW mode, it is possible for the masters to support overflows in case they cannot send all of their data through the STM 102. The masters can signal loss of data to the external trace device using the OVRF message, which tells the external trace device that some data has been lost between the overflow message and the previous message from the same master.

As note above, the STM 102 stores the messages in a FIFO buffer 207, and this can also be used to also cross clock domain boundaries if the bus interface clock is not the same as the output interface clock, as illustrated in FIG. 2. The implementation of the FIFO buffer 207 may be accomplished through any number of known techniques, dependent upon the level of optimization desired. For example, an implementation could use one FIFO slot to store one message, whereas another implementation could store one bus access per slot. Different implementations could also use different compression methods to store the data in the buffer to increase the storage efficiency of the FIFO.

The FIFO read logic 205 reads the messages in the buffer one at a time and sends them to the output control 206 which then transmits them to the external trace device 112. The output control is generally partitioned separately from the FIFO read logic 205 to make it possible to replace the output control logic with another transport method, if desired. For example, another implementation could use signaling similar to Serial ATA to output the trace data.

Figure 3:
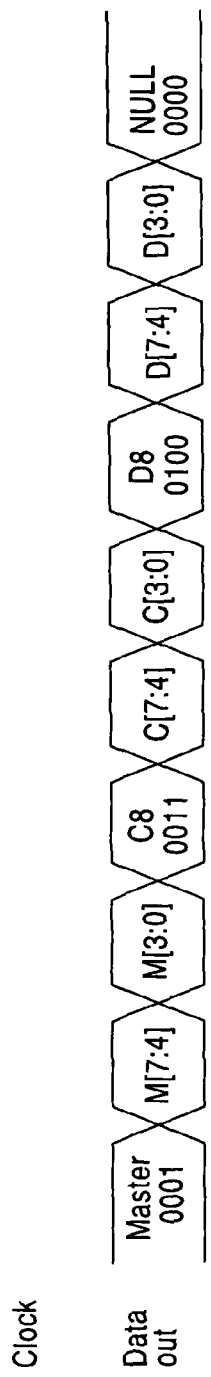
FIG. 3 illustrates relative timing of the outputs of an exemplary XTI system of the invention.
Figure 5:
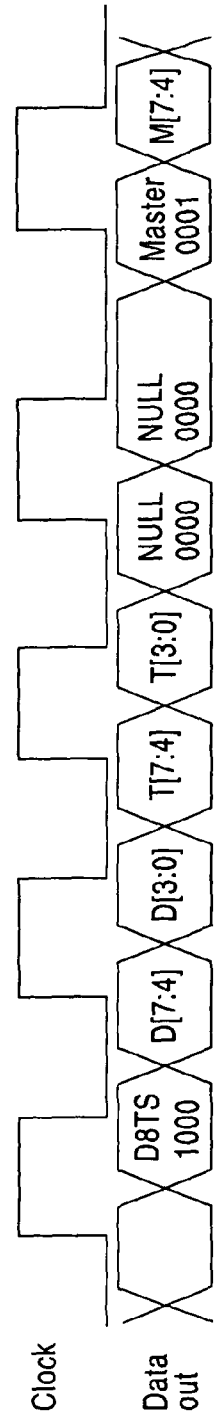
FIG. 5 illustrates relative timing of the outputs of an exemplary XTI system of the invention.

The output control logic is responsible for driving the outputs. The relative timing of the outputs is displayed in FIGS. 3 and 5. The output of the STM 102 uses double data rate (DDR) signaling, which means that new data is stored in Data Out on both edges of Clock. Thus, the effective bit rate output from XTI is 8*f(Clock). For example, with a 100 MHz Clock, XTI throughput can reach 800 Mbit/s. The output logic can be replaced with another transport if an appropriate receiver is also made for the external trace device. The external trace device 112 waits for a pause (silence) in the XTI nibble stream. If a long enough pause is detected, it's guaranteed that the next nibble belongs to a message header, i.e., it is the first nibble of a new message.

The clock control sub-block controls power management in the STM 102 by shutting down clocks when they are not needed. The STM 102 also outputs the an idle signal to the ASIC top level, which signals that STM 102 is ready to be powered down, i.e., the FIFO buffer is empty and all state machines are in idle state.

The XTI system 100 allows for expansion by implementing external trace modules 112, which provide trace data to STM 102. The external trace modules 112 create write accesses on the trace bus 103, and the STM 102 captures and encapsulates them for the external trace device 112.

If a single data item sent by the trace device fits within the maximum data size supported by STM 102, the trace operation is simple, as only a single write access is needed. In this case, the trace module should use the time-stamped address for writing the data to FIFO buffer 207. However, if the trace data does not fit within an XTI word, then the trace modules will generally use a slightly more complex signaling system to make it possible to achieve resynchronization, even if some data is lost in the data stream. All but the very last write of a single data block should use the non-time-stamped address in XTI, and the last write should be to the time-stamped address.

In operation, time stamps in the messages tell the external trace device 112 how many messages there were in the FIFO buffer 207 at the time the message was queued. This information makes it possible for the external trace device 112 to calculate the time when the message was queued based on the time the message arrived, and the amount of data in the FIFO buffer 207 before the message is transmitted. For example, assuming that the external trace device receives a D8TS message at time 123 us, and the time stamp value is 3, which indicates that there were 3 messages in the FIFO buffer 207 at the time the message was queued. If the PTI output clock is 10 MHz (4bit, double data rate), and the previous 3 messages were MASTER, C8, and D32. In this scenario, the time at which the message was queued can be calculated by noting that it took 15 clock edges, or 7.5 clock cycles to output the previous 3 messages. It is apparent that 7.5 clock cycles translates to 7.5*100 ns or 750 ns, and therefore, the message was queued at 123 us−750 ns=122.25 us. However, this result may need to be compensated with delays from the external trace device 112 and transport delays (in case of pipelines etc), to obtain a completely accurate result. However, for the purpose of calculating time differentials, the accuracy of this method is generally sufficient.

Therefore, the error in the time stamp is on the scale of half the length of the message prior to the first message in the FIFO. The time stamp generally represents the number of messages in the FIFO buffer 207; the time stamp generally does not take into account any delays encountered after the FIFO buffer 207. If these additional delays are not uniform in length, then the time stamp is typically not enough to ensure an accurate estimation of the time. The inventors contemplate that for time stamping to be used effectively in every application, there generally will not be a buffer positioned between the STM FIFO and the external pin interface. However, in general use, the exact times of all messages are not needed, as it is usually the beginning or end times of the stream of messages that are of interest, which is covered by the method of the invention.

Figure 4:
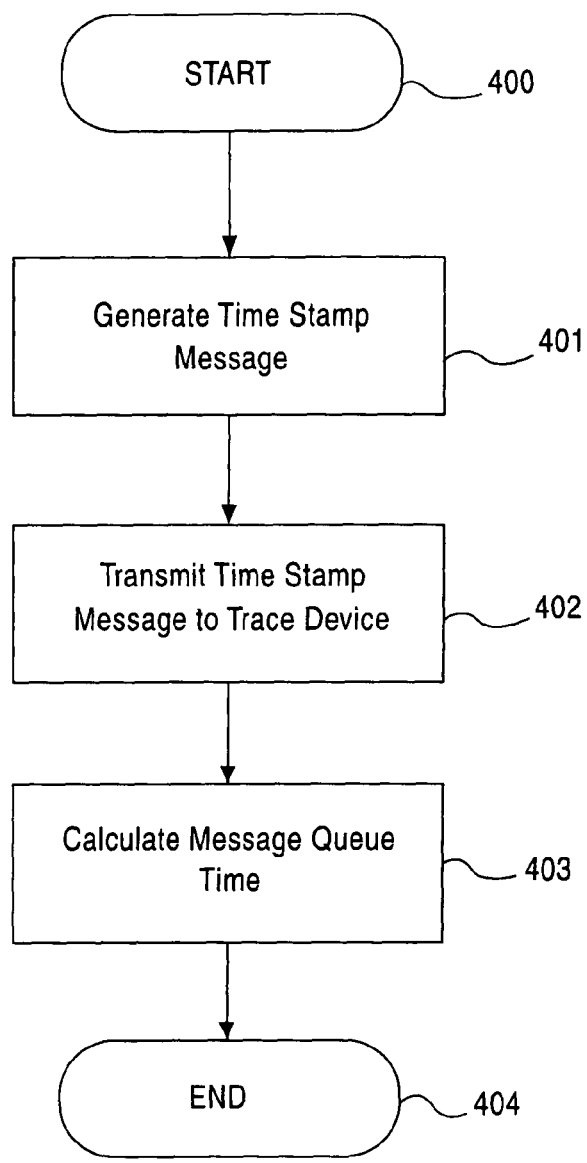
FIG. 4 illustrates a flowchart of an exemplary method of the invention.

FIG. 4 illustrates a flowchart of an exemplary method of the invention. The exemplary method begins at step 400 and continues to step 401, where the time stamp message is generated. The time stamp message generally includes information that indicates the number or quantity of messages in the STM FIFO buffer at the time the message in question (the message associated with the time stamp) was queued. The time stamp message is generated in the STM 102, and is then transmitted to the external trace device 112, as illustrated in step 402 and as shown in FIG. 1. Once the time stamp message is received in the external trace device 112, the external trace device 112 may use the time stamp information to calculate the time when the message associated with the time was queued. The calculation of the time the message associated with the time stamp was queued may be determined from the time the message associated with the time stamp arrived in the FIFO and the amount of data in the FIFO before the message was transmitted. Once the message queue time has been calculated at step 403, the method continues to step 404, where the method ends.

In another embodiment of the invention, the calculation of the message queue time may be completed on board the ASIC. For example, rather than sending the time stamp message information to an external trace device, the time stamp information may be processed by an component on board the ASIC 100. An exemplary on board component capable of conducting the processing may be the STM 102. Similarly, in yet another embodiment of the invention, the calculation of the message queue time may be conducted by an external processing device, such as the PC 114 illustrated in FIG. 1. In this embodiment of the invention, the time stamp message information, along with the information indicating the time the message associated with the time stamp message arrived in the FIFO and the amount of information in the FIFO before the message associated with the time stamp message is transmitted, may be transmitted to the PC 114 for processing and determining the message queue time.

Some of the many advantages of the method of the present invention include that the process of calculating the FIFO buffer status requires less hardware on the ASIC than a typical full-scale time stamp counter. Additionally, the number of bits to be transmitted is only equal to Log2 of the size of the FIFO buffer, and the method of the invention is much less dependent on the actual clock rates used inside the ASIC. Further, software adjustments of a time stamp counter to compensate for non-counting periods, such as deep sleep or long idle times, are not needed, and finally, in general, complexity is shifted from the ASIC to the target, where it is more economical to implement the complexities without occupying ASIC overhead and landscape.

In another embodiment of the invention, a computer program embodied on a computer readable medium may be provided. The computer program, when executed by a computer processor, may be configured to control any of the above discussed methods and apparatuses. In one specific embodiment of the invention, the computer program is configured to control, through a processor executing the computer program, a method for calculating message queue time. The method includes queuing a message into a buffer at a first time, generating a time stamp message representative of a number of messages in the buffer at the first time, transmitting the message to another device, transmitting the time stamp message to a trace device, and calculating the message queue time based upon the time stamp message, the first time, and an amount of data in the buffer.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   queuing a message into a buffer at an initial time;
   generating a time stamp message that indicates a number of messages stored in the buffer at the initial time;
   transmitting the message to a trace apparatus; and
   transmitting the time stamp message to the trace apparatus,
   wherein the trace apparatus is configured to calculate a queue time,
   wherein the queue time is the time the message was in the buffer before the message was transmitted, and
   wherein the queue time is calculated based on a time to transmit the number of the messages stored in the buffer and an arrival time of the message.

2. The method of claim 1, wherein generating the time stamp message comprises generating the time stamp message in a trace interface module.

3. The method of claim 2, wherein the trace interface module is positioned on an application specific integrated circuit with the buffer.

4. The method of claim 3, wherein the queuing the message is conducted in the trace interface module.

5. The method of claim 1, wherein the trace apparatus comprises a trace interface module positioned on an application specific integrated circuit.

6. The method of claim 1, further comprising receiving trace information in a trace interface module on board an application specific integrated circuit across a trace bus that is in communication with an arbiter.

7. A system, comprising:
   a trace interface device positioned on an integrated circuit and configured to queue a message into a buffer at an initial time and to generate a time stamp message that indicates a number of messages stored in the buffer at the initial time; and
   an output connecting the trace interface device with an external trace device, wherein the external trace device is configured to calculate a queue time based upon the time stamp message, the initial time, and an amount of data in the buffer,
   wherein the queue time is the time the message was in the buffer before the message was transmitted, and
   wherein the queue time is calculated based on a time to transmit the number of the messages stored in the buffer and an arrival time of the message.

8. An apparatus, comprising:
   a queuing module configured to queue a message into a buffer at an initial time;
   a time stamp generating module configured to generate a time stamp message that indicates a number of messages stored in the buffer at the initial time; and
   a transmitter configured to transmit the message and the time stamp message to a trace apparatus, wherein the trace apparatus is configured to calculate a queue time,
   wherein the queue time is the time the message was in the buffer before the message was transmitted, and
   wherein the queue time is calculated based on a time to transmit the number of the messages stored in the buffer and an arrival time of the message.

9. The apparatus of claim 8, wherein the time stamp generating module comprises a trace interface module and the buffer.

10. The apparatus of claim 9, wherein the trace interface module is in communication with the queuing module.

11. The apparatus of claim 8, further comprising:
at least one memory or peripheral device in communication with the queuing module via a hardware interface; and
at least one processor or direct memory access controller in communication with the queuing module via an operating system monitor.

12. An apparatus, comprising:
queuing means for queuing a message into a buffer at an initial time;
time stamp generating means for generating a time stamp message that indicates a number of messages stored in the buffer at the initial time;
transmitting means for transmitting the message and time stamp message to a trace apparatus, wherein the trace apparatus is configured to calculate a queue time,
wherein the queue time is the time the message was in the buffer before the message was transmitted, and
wherein the queue time is calculated based on a time to transmit the number of the messages stored in the buffer and an arrival time of the message.

13. A computer program embodied on a computer readable non-transitory medium, the computer program being configured to control a processor to execute operations, comprising:
queuing a message into a buffer at an initial time;
generating a time stamp message that indicates a number of messages stored in the buffer at the initial time;
transmitting the message to a trace apparatus;
transmitting the time stamp message to the trace apparatus, wherein the trace apparatus is configured to calculate a queue time,
wherein the queue time is the time the message was in the buffer before the message was transmitted, and
wherein the queue time is calculated based on a time to transmit the number of the messages stored in the buffer and an arrival time of the message.

14. A method, comprising:
receiving a message that was queued into a buffer at an initial time;
receiving a time stamp message, wherein the time stamp message indicates a number of messages stored in the buffer at the initial time; and
calculating a queue time based upon the time stamp message, the initial time, and an amount of data in the buffer,
wherein the queue time is the time, the message was in the buffer before the message was transmitted, and
wherein the queue time is calculated based on a time to transmit the number of the messages stored in the buffer and an arrival time of the message.

15. The method of claim 14, wherein the calculating is conducted in at least one of a trace interface module positioned on an application specific integrated circuit, an external trace device in communication with the application specific integrated circuit, or in a computing device external to the application specific integrated circuit and being in communication with the external trace device and the trace interface module.

16. An apparatus, comprising:
a receiver configured to receive a message that was queued into a buffer at an initial time and to receive a time stamp message, wherein the time stamp message indicates a number of messages stored in the buffer at the initial time; and
a trace module configured to calculate a queue time based upon the time stamp message, the initial time, and an amount of data in the buffer,
wherein the queue time is the time the message was in the buffer before the message was transmitted, and
wherein the queue time is calculated based on a time to transmit the number of the messages stored in the buffer and an arrival time of the message.

17. The apparatus of claim 16, wherein the trace module comprises at least one of a trace interface module positioned on an application specific integrated circuit, an external trace device in communication with the application specific integrated circuit, or a computing device external to the application specific integrated circuit and being in communication with the external trace device and the trace interface module.

18. A computer program embodied on a computer readable non-transitory medium, the computer program being configured to control a processor to execute operations, comprising:
receiving a message that was queued into a buffer at an initial time;
receiving a time stamp message, wherein the time stamp message indicates a number of messages stored in the buffer at the initial time; and
calculating a queue time based upon the time stamp message, the initial time, and an amount of data in the buffer,
wherein the queue time is the time the message was in the buffer before the message was transmitted, and
wherein the queue time is calculated based on a time to transmit the number of the messages stored in the buffer and an arrival time of the message.

19. A method comprising:
receiving a message that was queued into a buffer at an initial time;
receiving a time stamp message wherein the time stamp message indicates a number of messages stored in the buffer at the initial time;
calculating a queue time based upon the time stamp message, and an arrival time of the message,
wherein the queue time is the time the message was in the buffer before the message was transmitted, and
wherein the queue time is calculated based on a time to transmit the number of the messages stored in the buffer and the arrival time of the message.

20. An apparatus comprising:
a receiver configured to receive a message that was queued into a buffer at an initial time and configured to receive a time stamp message wherein the time stamp message indicates a number of messages stored in the buffer at the initial time;
a trace module configured to calculate a queue time based upon the time stamp message and an arrival time of the message,
wherein the queue time is the time the message was in the buffer before the message was transmitted, and
wherein the queue time is calculated based on a time to transmit the number of the messages stored in the buffer and the arrival time of the message.

* * * * *